United States Patent [19]
Young

[11] 3,902,155
[45] Aug. 26, 1975

[54] SUBMARINE OBJECT LOCATER

[75] Inventor: Clinton J. T. Young, Alexandria, Va.

[73] Assignee: Melpar, Inc., Alexandria, Va.

[22] Filed: Aug. 29, 1952

[21] Appl. No.: 307,135

[52] U.S. Cl. .................................. 340/5 R; 340/6 R
[51] Int. Cl. ............................................ H04b 11/00
[58] Field of Search.............. 340/2, 5, 4, 6 R, 16 C; 114/221

[56] References Cited
UNITED STATES PATENTS

| | | | |
|---|---|---|---|
| 1,310,568 | 7/1919 | Heap et al. | 340/2 |
| 2,368,953 | 2/1945 | Walsh | 340/16 |
| 2,398,432 | 4/1946 | Livermore | 340/5 |
| 2,422,337 | 6/1947 | Chilowsky | 340/2 |
| 2,447,069 | 8/1948 | Holcomb | 340/2 |
| 2,448,713 | 9/1948 | Hansell | 340/2 |
| 2,448,787 | 9/1948 | Ferrel | 340/2 |
| 2,530,093 | 11/1950 | Speed | 340/2 |
| 2,629,083 | 2/1953 | Mason | 340/2 |

FOREIGN PATENTS OR APPLICATIONS

| | | | |
|---|---|---|---|
| 3,696 | 3/1919 | United Kingdom | 340/2 |

Primary Examiner—Richard A. Farley
Attorney, Agent, or Firm—Hyman Hurvitz

EXEMPLARY CLAIM

1. A system for detecting a mine comprising a buoyant underwater detector, a casing for said detector, means anchoring said detector at a predetermined level and location in a body of water, a normally de-energized underwater sonic transmitter in said casing, said detector including means responsive only to the sonic signature of a mine produced by passage of the mine into and through a body of water for producing a sonic control signal, means responsive to said sonic control signal for energizing said normally deenergized sonic transmitter, and an underwater detecting unit for said sonic control signal, said underwater detecting unit depending from a navigable craft.

8 Claims, 6 Drawing Figures

INVENTOR.
CLINTON J. T. YOUNG

ATTORNEY

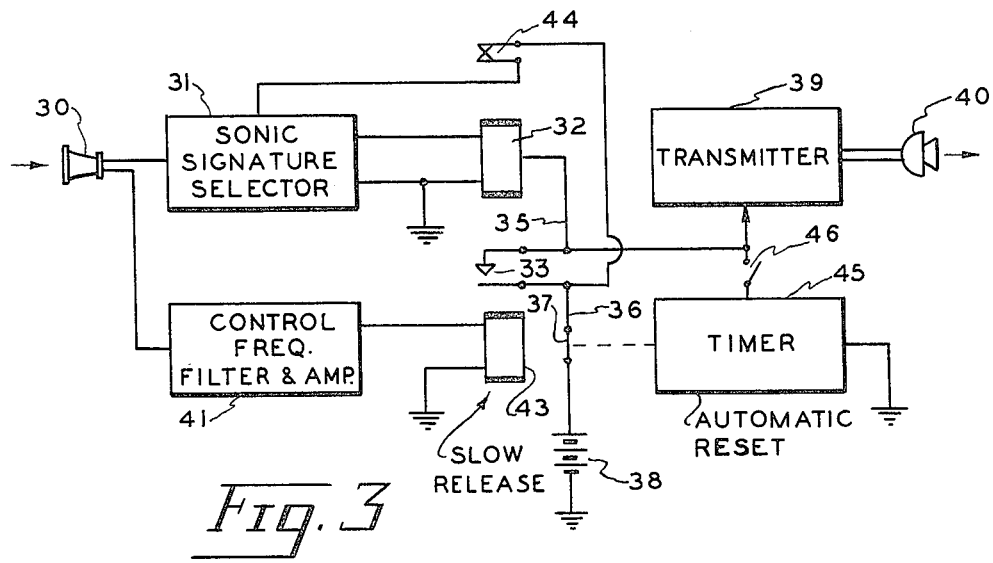
Fig. 3
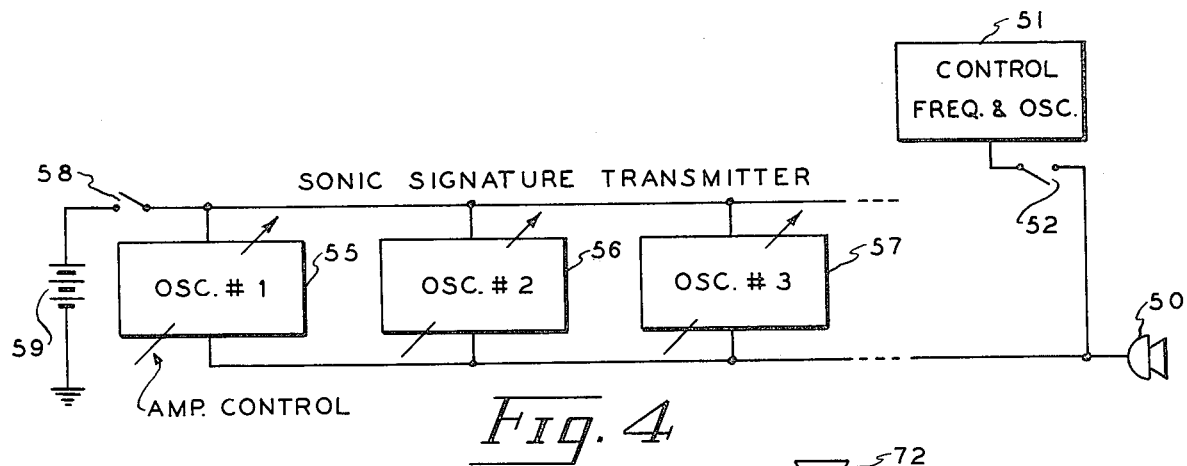
Fig. 4
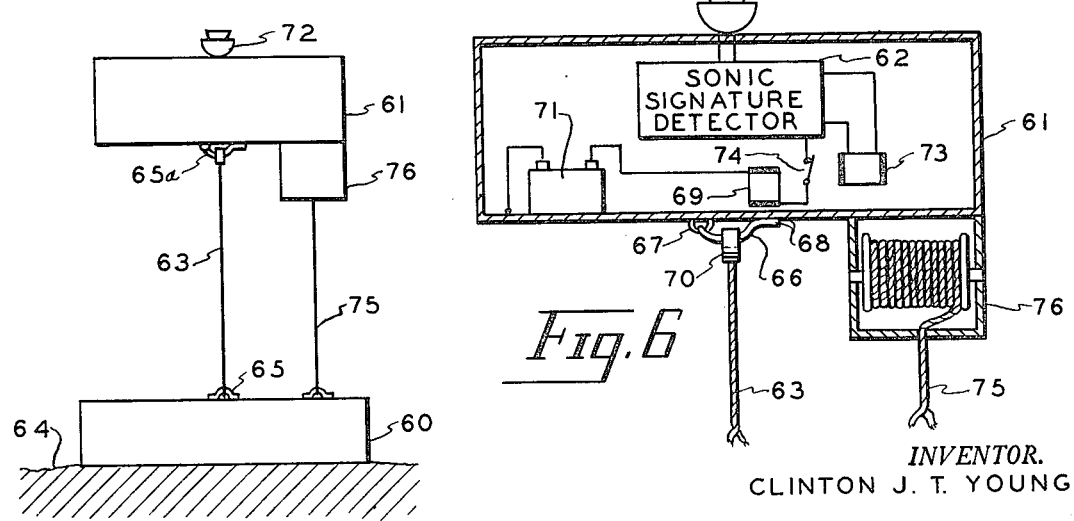
Fig. 5
Fig. 6

SUBMARINE OBJECT LOCATER

The present invention relates generally to systems for detecting non-buoyant mines, and for signaling the location of such mines, so that they may be destroyed, removed, or otherwise rendered harmless.

Briefly described, in accordance with the invention, I lay down in an area in which mines may be sown, a geographic pattern of sensing devices, capable each of responding to the sonic and/or pressure signature generated by adjacent passage of a mine. When a sensing device responds to the passage of a mine, a reaction capable of being detected is generated, so that the mines may be located by location of the reacting device. Such sensing devices must be designed to respond to the passage of a mine, rather than to its mere presence, because the mines with which the present invention is concerned may be non-magnetic and hence difficult to detect by magnetometer-type detectors. At the same time such mines are non-buoyant, and hence are difficult to distinguish from debris, rocks, and the like, and are difficult to locate in the muck and vegetation often present at the bottom of a body of water.

Mines of the non-buoyant type can be sown from aircraft, in ship channels, harbors, or the like, and are generally designed to explode in response to passage of a vessel overhead, and in response to stimuli of various types associated with movement of a large vessel. Such mines may respond to propeller noise, for example, or to the known sonic signature of a sufficiently large vessel, or in response to some vessel other than the first to pass over the mine. Mine sweepers are at a disadvantage in the face of mines of the type disclosed, as are all conventional mine detection systems, and the mines are extremely difficult to find once they have become quiescent.

An important problem in mine detection is that of rapid discovery of the mines. If it is known or suspected that non-buoyant mines have been sown on the bottom of a ship channel, the channel is unsafe for shipping until cleared. If the process of clearing the channel consumes large amounts of time, or is uncertain of result, the channel is interdicted for considerable periods of time. Hence, even without dropping mines, but merely by causing it to be suspected that mines have been sown, a shipping channel may become unused until its safety can be checked. And if it is known that mines been sown, the channel may remain unused until the mines are located and destroyed.

It is, therefore, important that mines be detected when dropped, or very shortly thereafter, and pinpointed for destruction, or removal or de-activation. The quickest, simplest, and cheapest mode of disposing of a mine is to effect an explosion adjacent thereto, which serves either to crack its case, or to disable its mechanism. I therefore address myself primarily to a system of mine detection wherein the detected mines are to be disabled by underwater explosion. The latter fact of itself implies certain characteristics in the mine sensing apparatus, and specifically that it must inherently not sense adjacent underwater explosion, or must be capable of being disabled, at will, so that it will not respond to adjacent underwater explosions. It is to be understood, however, that my invention is not limited to particular modes of de-activating, removing, or destorying mines.

Since reliability is an important characteristic of devices of the character here involved, it may be desirable that the system be of such character that it can readily be tested for operativeness, or be self-testing, and indicate its own inoperative condition. Moreover, since large quantities of the devices will be used, simplicity, and economy of fabrication thereof, are extremely important considerations.

Two possibilities appear to exist, with respect to detection of reacting devices, i.e., devices which have detected mine passage and are signaling to that effect. The sensing device may be buoyant and permanently located underwater, hanging above vegetation and muck level, and secured at the end of an anchor. Or, in the alternative, the device may be so disposed until it has sensed a mine, and thereafter may be released to float to the surface. In the latter case the fact that a sensing device has risen to the surface may be indicative of the fact that it has sensed a mine, and may be its sole reaction. In the first mentioned case the sensing device may emit an underwater signal, which may then be sonically detected either from a helicopter or surface vessel. On the other hand, a floating object can readily be detected by radar, or visually, from a long distance.

I have therefore provided, as one preferred embodiment of my invention, a buoyant device for sensing the passage of a mine, which is anchored under water, but which is released to float to the surface in response to detection of a mine. Such a device may be caused to surface in response to a signal deliberately propagated to the device for that purpose. In particular, if each sensing device is set to react in response to a sonic or pressure signature corresponding with passage of a mine sinking adjacent thereto, a signal corresponding to at least certain features of the signature may be transmitted to the sensing device from the surface whenever desired, and will cause the sensing device to surface, for purpose of testing and maintenance.

It is also desirable that whenever a sensing device becomes inoperative, that fact be communicated promptly. In the presently described embodiment of my invention, I may provide that a device which has become inoperative may automatically surface, so that it may be quickly retrieved and serviced.

The advantages which accrue when activiation of a mine sensing device causes the mine to rise to the surface are (1) simplicity, since the sensing device may be passive and need not itself emit sonic or radio signals, (2) ease of discovery, since the sensing device may be readily and very quickly located at night by surface search radar, from considerable distance, and by either air or surface search. During the day the device may be visually evident.

If the sensing device becomes inoperative, as for power failure or the like, it will be brought to the surface, automatically, which is the same reaction as occurs when a mine is discovered. However, simple tests of a surfaced unit will indicate whether or not it is defective, and hence whether or not a mine is present.

Testing of the devices to determined whether they are operative to detect mines can be accomplished readily by a signal, transmitted from a surface vessel or aircraft to the sensing device, and which duplicates at least some features of the mine's sonic or pressure signature. The test is therefore one which reflects the capacity of the sensing device to respond to mines, i.e., to perform its intended function.

Devices which are permanently located underwater, and which are caused to emit sonic signals in response to a mine's sonic signature, possess certain advantages. While they require a sonic transmitter, they are easy to pin-point accurately, and are not affected appreciably as to location by ocean currents, nor liable to be lost due to collision with vessels or action of storms, or the like.

It is desirable, in such devices, to provide circuits for disabling the devices in response to a predetermined control signal, so that destruction of a mine near by, for example, by explosion, will not set-off adjacent units. It is further desirable to provide circuits for re-setting a unit which has been emitting sound, either after a predetermined time or in response to a control signal, or both, so that a single device will be useful to respond to a plurality of mines, and will not run down or dissipate all its available power, when once triggered off by a mine's sonic or pressure signature.

In what follows, for purpose of brevity, the term mine sonic signature is to be understood to include sequential pressure variations in water caused by a mine, including variations of pressure of a transient nature, and frequencies from the lowest to the highest which may be generated in significant intensity in response to passage of a mine into and through water.

It is, accordingly, a primary object of the present invention to provide a system for detecting a mine, and for indicating the location of the mine.

It is a further object of the invention to provide a system for detecting non-magnetic, non-buoyant mines and indicating their presence.

It is still another object of the invention to detect a mine sown from an aircraft, in response to the sonic signature of the mine in proceeding through a body of water, and for indicating the presence and location of the mine by dislocation of a passive device to a position readily observable visually or by radar.

Another object of the invention resides in the provision of a system for detecting mines in a body of water by means of an anchored buoyant detector which is released to the surface in response to the sonic signature of a mine passing adjacent the detector.

Another object of my invention resides in the provision of a buoyant mine detector which shall be normally anchored under water, and released to the surface in response to the sonic signature of a mine, and in which such release shall also occur in response to failure of power supply in the unit.

It is another object of the invention to provide a system for locating mines, which is responsive to the sonic signature of a mine moving through water to effect energization of a sonic transmitter, the latter being discoverable by means of a sonic directional receiver aboard a vehicle, surface or air borne, as desired.

Another object of the invention resides in the provision of a beacon responsive to a sonic signature to energize a sonic transmitter, and to maintain the transmitter operative for a period determined by a timing unit, or terminable in response to a control signal.

It is another object of the invention to provide a sonic transponder, which may be tested by transmission thereto of a predetermined sonic signature.

The above and still further objects, features, and advantages of the invention will become apparent upon consideration of the following detailed description of a specific embodiment of the invention, especially when taken in conjunction with the accompanying drawings, wherein:

FIG. 3 is a functional block diagram of a detector-transmitter unit of a type employable in the system of FIG. 1;

FIG. 4 is a functional block diagram of a device for transmitting control signals or simulated sonic signatures to the system of FIG. 3;

FIG. 5 illustrates the general spatial arrangement of an anchored sonic signature detector; and FIG. 6 is a view in detail of an operating element of the arrangement of FIG. 5.

Figure 1:
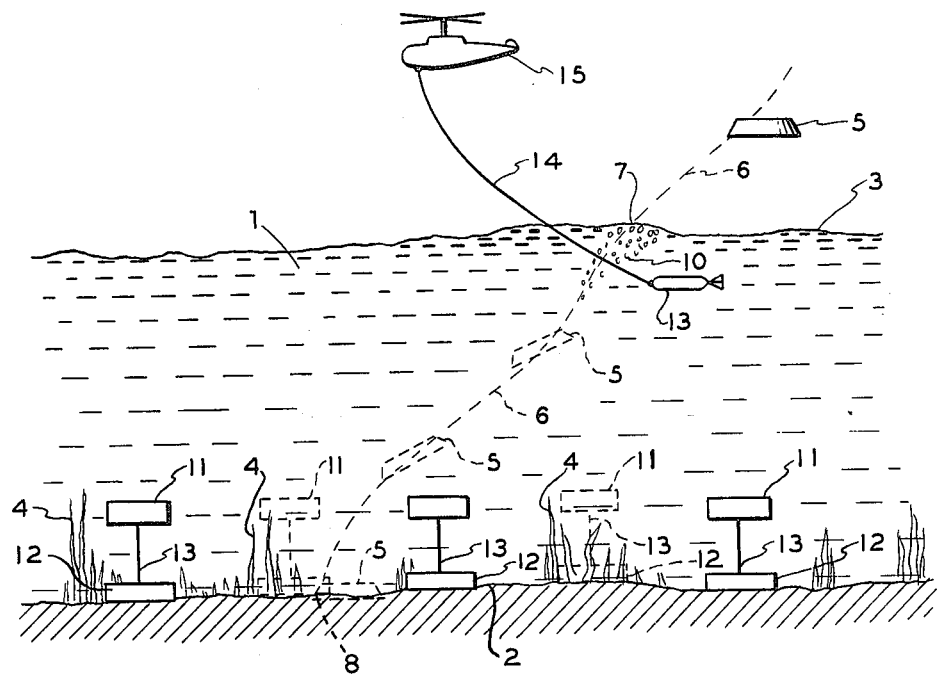
FIG. 1 is a view in side elevation indicating one mine detection system in accordance with the present invention.

Briefly described, in accordance with one embodiment of the invention a plurality of sonic receivers is disposed in a pattern under water along a channel, on the floor of a harbor, or in any area to be protected. The receivers are in buoyant cases, anchored above bottom. The receivers are associated each with an underwater sonic transmitter, normally unenergized. The receiver includes two separate channels connected to a sound head. One of the channels, in a preferred embodiment of the invention, includes a set of filters designed to energize a relay only in response to a predetermined combination of sonic frequencies applied to the relays, in accordance with the teachings of U.S. Pat. No. 2,368,953, issued Feb. 6, 1945, to P. J. Walsh. In the other channel is included a single frequency filter, which responds to a test frequency only, and which energizes a second relay. The sonic signature selector relay is self-locking, and when locked energizes the sonic transmitter. The second relay, when energized, opens the circuit to the self locking relay, thereby de-energizing the transmitter, and in addition and optionally a time controlling unit may be utilized, to open the circuit of the self locking relay after passage of a reasonable time, so that if an active mine sensing unit has been missed in search it will not continue to transmit until its batteries are run down.

Whenever a sensing unit has been energized by a mine, by generation of the sonic signature of the mine adjacent the sensing unit, the underwater sonic transmitter of the sensing unit is energized and starts to transmit. At reasonably frequent intervals, say each 6, 8 or 12 hours, a helicopter or other suitable vehicle patrols the area being monitored for mines, and discovers the location of those which are transmitting. These mines may be then pin-pointed, as by high definition sonar, and eventually destroyed.

In order that it may be possible to test the sonic detecting units, provision is made for transmitting from the helicopter, or other suitable vehicle, a group of signals corresponding sufficiently with the sonic signature of a mine, and if in response a detection unit transmits, it is evidence that the unit is completely operative. The sonic transmitter may be cut-off in response to transmission of a control signal frequency, and this may be desirable to accomplish not only following testing of a unit, but also during or following blasting of a mine.

In accordance with a further embodiment of the invention, the sonic detector devices are anchored under water, and in response to a mine's sonic signatures do not transmit signals but are released to the surface of the water, where they remain anchored. The units are then discovered visually, or by radar. To accomplish the stated function, the units are secured to an anchor by two separate and distinct cables. One of these is short, and anchors the detector unit under water, at a predetermined level. The latter cable is secured to the detector unit casing by an electro-magnetic latch, which is released only when the detector unit receives substantially the sonic signature for which it is designed. The other cable is of length sufficient to enable the detector unit to float, and becomes active only when the first cable has been released.

A detection unit may then be brought to the surface in response to passage of a mine adjacent thereto, or in response to a test signal of sufficiently corresponding nature. In addition failure of current flow from a battery power supply, or considerable reduction of current flow, will also serve to release the unit to the surface.

When a unit floats to the surface, and is discovered, it may be hauled in for inspection, renewal of batteries, or service. It may be re-used by supplying it with a new anchor and cables.

Referring now more specifically to the accompanying drawings, and particularly to FIG. 1, the reference numeral 1 identifies a body of water, having a floor 2 and a surface 3, the floor being assumed overgrown with vegetation 4, and having surface irregularities therein, not shown. It is assumed that a non-buoyant mine, as 5, has been dropped from a hostile aircraft, and is falling in the trajectory 6, entering the water at 7 and falling ultimately to the floor at point 8. The mine is assumed further to entrain air bubbles, as set at 10, and to possess a chracteristic sonic signature, in entering and passing through the body of water 1, i.e., to be identifiable by a characteristic distribution of sonic frequencies or sonic frequency spectrum, and/or by a characteristic sequence of pressure variations.

In order to detect the mine during its fall in water and in response to its sonic signature, I employ a large number of sonic detectors, as 11, each of which is buoyant, and anchored to the floor 2, as by a weight or anchor 12 and a cable 13. Some convenient pattern and spacing is employed, in sowing the sonic detectors 11, which will be determined by the character and intensity of the mine's sonic signature, and other such practical considerations, in a given case.

In accordance with a first embodiment of the invention the devices 11 each include a sonic detector, responsive to the sonic signature (in the broad sense) of a mine, to cause energization of a sonic transmitter. In such case the location of an energized sonic transmitter may be determined by means of a sonic direction finder, represented conventionally at 13, and which may correspond in detail with the teaching and disclosure of any of the following Letters Patent of the United States taken by way of example only, Chilowsky, U.S. Pat. No. 2,361,177, issued Oct. 24, 1944; Steinhoff, U.S. Pat. No. 2,376,730, issued May 22, 1945.

The device 13 may be propelled through the body of water by a helicopter 15, preferably, although a blimp is also suitable, or a surface vessel may be employed if no helicopter or blimp is available. Power may be delivered to the unit 13, and signal derived therefrom over the cable 14, or over a supplementary cable. Once an operative sonic transmitter 11 has been found the approximate location of a mine is determined. Thereafter the precise location of the mine may be determined, as by a diver, or by high definition sonar, and the mine eventually rendered harmless.

Figure 2:
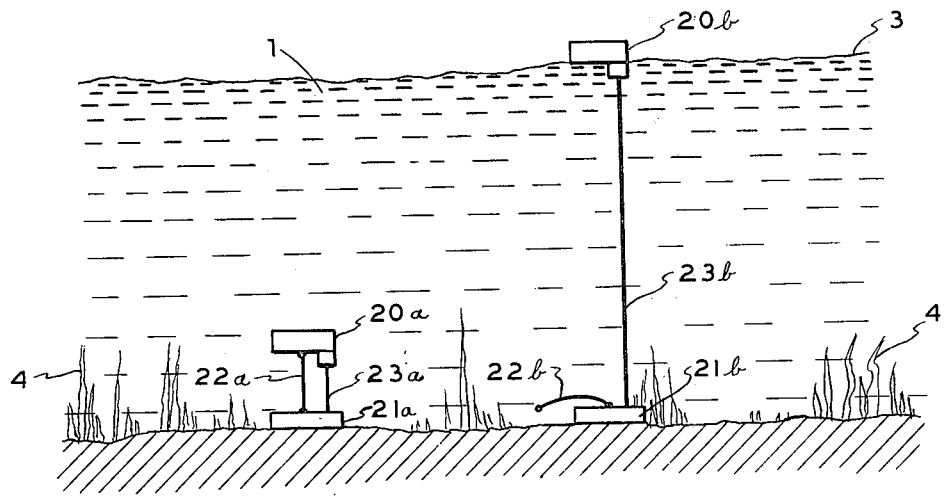
FIG. 2 is a view in side elevation of a further embodiment of the invention.

In FIG. 2 is illustrated in broad outline a further embodiment of the invention, wherein the sonic signature detectors are identified by reference numerals 20a, 20b, and may be assumed sown in a pattern, as in the case of FIG. 1. One of the units 20a, is shown attached to an anchor 21a, by means of a first short taut cable 22a, which is permanently attached to anchor 21a and detachably to unit 20a. A further long cable 23a, is provided, which is permanently secured to both anchor 21a and unit 20a, and which permits unit 20a to float to the surface 3, when cable 22a releases. A released unit, floating on the surface 3, is shown at 20b, and the cable 22b is shown in released condition, the unit 20b being secured to the anchor 21b solely by long cable 23b.

In the system of FIG. 2 the actuated detector 20b, may be located by visual observation or by radar. Thereafter the procedure is as in the case of FIG. 1, in order to destroy the mine which caused elevation of detector 20b.

In FIG. 3 is illustrated, largely by functional block diagram, a detector-transmitter unit, of the type preferably employed in the system of FIG. 1. In the system of FIG. 3 is provided a sonic pick-up unit 30, coupled with a sonic signature selector 31, which may be of the character of that illustrated in the aforementioned U.S. Patent to Walsh, citation of which is not, however, to be taken as limiting. By virtue of the operation of sonic signature selector 31 a circuit to a relay 32 is closed upon receipt of a mine's sonic signature. When energized the relay 32 closes normally open contact pair 33, which serve to complete a locking circuit for relay 32, via lead 35, contacts 33, lead 36, normally closed switch 37, and battery 38. Hence, on transient energization the relay 32 closes a permanent energizing circuit for itself.

Referring to FIG. 3, it is readily seen that power will be transmitted from battery 38 to sonic transmitter 39, which proceeds to transmit a sonic signal, via transducer 40. It is the latter signal which is to be traced by direction finder 13. To this end the transmitter 39 may transmit sufficient sonic energy to be readily detectable at distances of say 1,000. ft. to 5,000. ft., and the transducer 40 may preferably be omni-directional. The transmissions from transducer 40 must not be of such character that they may actuate any of the adjacent sonic signature selectors, obviously.

Connected with sonic detector 30 is a control frequency filter and amplifier 41, which is responsive to a special sonic frequency, not otherwise employed in the system, and which may be continuously powered by means not shown. Upon reception of a control signal by filter and amplifier 41, the relay coil 43 is energized, which opens the contacts 33, breaking the energizing circuit to relay 32 and to transmitter 39.

At the same time, when relay coil 32 is energized normally closed contacts 44 are opened thereby, and application of power to sonic signature selector 31 interrupted.

A time control unit 45 is provided, which is energized only when manual switch 46 is closed, and which is energized from battery 38 only while transmitter 39 is also energized, The time control device 45 operates, in conventional fashion, to open switch 37 after a predetermined time, and for a very short interval sufficient to de-energize the relay 32 and hence to deprive transmitter 39 of power. Thereafter the switch 37 is again closed, and the unit thus prepared for reception of a new sonic signature. The timer 45 is essentially a clock, and is of the self-resetting type, i.e., it resets to zero whenever its power is interrupted, and counts time from zero when energized.

The system of FIG. 3 may clearly be tested by transmitting thereto an artificially generated sonic signature, corresponding sufficiently with that of a mine, and since this starts a transmitting cycle of trasmitter 39, the control frequency may then be utilized to reset the system, by transmission to control frequency filter and amplifier 41 of a short burst of control signal.

In summary then, sonic signature selector 31 is normally powered through contacts 44. On receipt of a signature signal contacts 44 open, de-energizing selector 31. Contacts 33 close, however, energizing transmitter 39, and timer 45. The latter cuts off the transmitter after some predetermined time, and resets itself for a further timing operation, and at a resetting reconnects sonic signature selector 31 to battery 38.

If desired, and for as long as desired, the entire system may be disabled by applying control signal frequency to unit 41.

In FIG. 4 is illustrated a device capable of transmitting a control frequency, or a simulated mine's sonic signature to the system of FIG. 3. There is provided a transducer 50, a control frequency oscillator 51, connected to the transducer 50 via a manual switch 52. A further bank of amplitude controllable oscillators 55, 56, 57 . . . is provided, so that all the necessary components may be provided in the requisite relative amplitudes, and if necessary in proper sequence. The oscillators 55, 56, 57 . . . are connected in parallel to transducer 50, and all via manual switch 58 to battery, or other power source 59.

By manual manipulation of switches 52 and 58, a simulated mine's sonic signature, or a control frequency, may be transmitted to one or more of the systems of FIG. 3, for purpose of test, reset or disabling.

Referring now more particularly to the system of FIGS. 5 and 6, there is illustrated an anchor 60, in the form of a weight. To the latter is attached a case 61, containing a buoyant mine sonic signature detector 62. The case 61 is secured to the anchor 60 by means of a short cable 63, so that the case 61 floats above the floor 64 of a body of water, but well below its surface. The cable 63 is secured at one end to the anchor 60 by means of an eye bolt 65. At the other end the cable 62 is secured to the case 61 by means of an electromagnetically operated latch 65a. The latch 65a comprises an arcuate latch member 66, hingedly secured at one end to case 61, by hinge 67, and comprising a magnetic armature 68 at the other end, which is maintained in contact with case 61 by the attraction of an electromagnet 69, located interiorly of case 61. The cable 63 is terminated by a ring 70, which encircles the latch 66.

The electro-magnet 69 is connected in series with a battery 71, which powers sonic signature detector 62, itself located within casing 61, and having a sonic transducer 72 extending from the casing.

When sonic signature detector 62 is actuated by the requisite sonic signature, it closes a circuit to slow release relay coil 73, which in turn opens switch contacts 74, and thus the power circuit to electro-magnet 69. On becoming de-energized the latter releases latch 66, permitting ring 70 to slip off latch 66, and thus to free cable 63. The relay coil 73, or its contacts, must be sufficiently slow to release, obviously, that the desired sequence of events will be permitted.

The buoyant case 61 now rises to the surface of the body of water, secured now by cable 75, which plays out from reel 76, and is of sufficient length just to permit case 61 to reach the surface, and to allow streaming and for variations of water level due to tides, wind and the like.

Once a casing 61 has risen to the surface it may be located visually, or by radar, and when located serves to show the approximate position of the mine which has actuated the sonic signature detector.

It will be clear that the system of FIG. 6 will effect release of latch 66, and hence that casing 61 will rise to the surface, on failure of battery 71.

As a practical matter, once the device of FIG. 6 has risen to the surface, and has been discovered, it can be tested in any of a number of ways, to discover if in fact it had arisen because of a defect. If not, the indication is clear that it must have arisen because it detected a mine.

What I claim is:

1. A system for detecting a mine comprising a buoyant underwater detector, a casing for said detector, means anchoring said detector at a predetermined level and location in a body of water, a normally de-energized underwater sonic transmitter in said casing, said detector including means responsive only to the sonic signature of a mine produced by passage of the mine into and through a body of water for producing a sonic control signal, means responsive to said sonic control signal for energizing said normally de-energized sonic transmitter, and an underwater detecting unit for said sonic control signal, said underwater detecting unit depending from a navigable craft.

2. A system for detecting a mine comprising a buoyant underwater detector, a casing for said detector, means anchoring said detector at a predetermined level and location in a body of water, a normally de-energized underwater sonic transmitter in said casing, said detector including means responsive only to the sonic signature of a mine produced by passage of the mine into and through a body of water for producing a sonic control signal, means responsive to said sonic control signal for energizing said normally de-energized sonic transmitter, and further means responsive to a predetermined underwater sonic control signal for de-activating said sonic transmitter.

3. A system for detecting a mine comprising a buoyant underwater detector, a casing for said detector, means anchoring said detector at a predetermined level and location in a body of water, a normally de-energized underwater sonic transmitter in said casing, said detector including means responsive only to the sonic signature of a mine produced by passage of the mine into and through a body of water for producing a sonic control signal; and means responsive to said sonic control signal for energizing said normally de-energized sonic transmitter, said latter responsive means including a normally de-energized relay, normally open contacts for said relay, a source of electric power, means for completing a circuit for said sonic transmitter from said power source via said contacts, said relay energized in response to said sonic control signed to close said contacts, and a locking circuit for said relay powered from said power source.

4. A system for detecting a mine comprising a buoyant underwater detector, a casing for said detector, means anchoring said detector at a predetermined level and location in a body of water, a normally de-energized underwater sonic transmitter in said casing, said detector including means responsive only to the sonic signature of a mine produced by passage of the mine into and through a body of water for producing a sonic control signal; and means responsive to said sonic control signal for energizing said normally de-energized sonic transmitter, said latter responsive means including a normally de-energized relay, normally open contacts for said relay, a source of electric power, means for completing a circuit for said sonic transmitter from said power source via said contacts, said relay energized in responsive to said sonic control signal to close said contacts, and a locking circuit for said relay powered from said power source; said underwater detector including a sonic signature selector normally operative and capable of being rendered selectively operative and inoperative, and means responsive to energization of said relay for rendering said sonic signature selector inoperative during such energization.

5. A system for detecting a mine comprising a plurality of buoyant underwater detectors, a casing for each of said detectors, means anchoring each of said detectors at a predetermined level and location in a body of water, a normally de-energized underwater sonic transmitter in each of said casings, said detectors including each means responsive only to the sonic signature of a mine produced by passage of the mine into and through a body of water for producing a sonic control signal; and means responsive to said sonic control signal for energizing said normally de-energized sonic transmitter, said latter responsive means including a normally de-energized relay, normally open contacts for said relay, a source of electric power, means for completing a circuit for said sonic transmitter from said power source via said contacts, said relay energized in response to said sonic control signal to close said contacts, and a locking circuit for said relay powered from said power source.

6. The combination in accordance with claim 5 wherein is further provided means for de-energizing said relay after a predetermined time of operation of said sonic transmitter.

7. The combination in accordance with claim 5 wherein is further provided means for de-energizing said relay in responsive to a sonic control signal supplied to said underwater detectors via said body of water.

8. The combination in accordance with claim 5 wherein said underwater detectors each includes a sonic signature selector normally operative and capable of being rendered selectively operative and inoperative, and means responsive to energization of said relay for rendering said sonic signature selector inoperative during such energization.

* * * * *